(12) United States Patent
Schoenaers

(10) Patent No.: US 12,521,220 B2
(45) Date of Patent: Jan. 13, 2026

(54) RECOVERY CUSHION FOR ANIMALS

(71) Applicant: Pierre Schoenaers, Waremme (BE)

(72) Inventor: Pierre Schoenaers, Waremme (BE)

( * ) Notice: Subject to any disclaimer, the term of this patent is extended or adjusted under 35 U.S.C. 154(b) by 1093 days.

(21) Appl. No.: 17/385,772

(22) Filed: Jul. 26, 2021

(65) Prior Publication Data

US 2023/0028171 A1 Jan. 26, 2023

(51) Int. Cl.
*A61D 3/00* (2006.01)

(52) U.S. Cl.
CPC ..................... *A61D 3/00* (2013.01)

(58) Field of Classification Search
CPC .......... A01K 1/035–0353; A01K 1/015–0157; A61D 3/00; A47G 9/1027; A47G 9/1045; A47G 9/1063; A61G 7/05707; A61G 7/05723; A61G 7/05969; A61G 7/07; A61G 13/126; A61G 13/1265
USPC .......................................... 5/632, 655.3, 657
See application file for complete search history.

(56) References Cited

U.S. PATENT DOCUMENTS

| | | | | |
|---|---|---|---|---|
| 4,054,960 A * | 10/1977 | Pettit | A47C 20/025 | 5/725 |
| 4,070,989 A * | 1/1978 | Ganzel | A61D 3/00 | 119/728 |
| 4,185,591 A * | 1/1980 | Patelis | A61D 3/00 | 119/723 |
| 4,473,913 A * | 10/1984 | Ylvisaker | A47G 9/10 | 5/632 |
| 4,491,089 A * | 1/1985 | Kelly | A01K 1/0157 | 119/722 |
| 4,777,678 A * | 10/1988 | Moore | A47C 20/027 | 606/240 |
| 5,010,843 A * | 4/1991 | Henry | A01K 1/0353 | 119/28.5 |
| 6,182,314 B1 * | 2/2001 | Frydman | A47C 20/021 | 606/240 |
| 6,925,669 B1 * | 8/2005 | Friedman | A47C 20/021 | 5/655.9 |
| 7,441,293 B1 * | 10/2008 | Singer | A47C 20/023 | 5/632 |
| 7,454,808 B2 * | 11/2008 | Parrilla | A47D 13/08 | 5/655 |
| 7,513,001 B1 * | 4/2009 | Leach | A47G 9/1045 | 5/655 |
| 8,365,329 B1 * | 2/2013 | Barsosky | A47D 13/083 | 5/655 |
| 8,661,588 B1 * | 3/2014 | Leach | A47D 15/001 | 5/655 |

(Continued)

FOREIGN PATENT DOCUMENTS

| | | |
|---|---|---|
| CA | 3039449 | 10/2019 |
| FR | 3039968 | 2/2017 |

(Continued)

*Primary Examiner* — Peter M Poon
*Assistant Examiner* — Hae Rei Jessica Byun
(74) *Attorney, Agent, or Firm* — Harness, Dickey & Pierce, P.L.C.

(57) ABSTRACT

The present invention relates to a recovery cushion assembly (1) for animals, comprising an inflatable main cushion body (3) taking the general shape of an E and an inflatable closing body (5) designed to be assembled with the main cushion body (3) thereby closing the E-shape of the main cushion body (3).

9 Claims, 3 Drawing Sheets

(56) References Cited

U.S. PATENT DOCUMENTS

| | | | |
|---|---|---|---|
| 2004/0177814 A1* | 9/2004 | Godshaw | A01K 1/0254 |
| | | | 119/28.5 |
| 2004/0255379 A1* | 12/2004 | Zheng | A47C 17/045 |
| | | | 5/413 AM |
| 2007/0157393 A1* | 7/2007 | Gerlach | A47D 15/006 |
| | | | 5/655 |
| 2007/0157891 A1* | 7/2007 | Wayn | B60R 22/10 |
| | | | 119/771 |
| 2015/0366368 A1* | 12/2015 | Cheng | A47C 7/467 |
| | | | 5/644 |
| 2016/0338499 A1* | 11/2016 | Langer | A47G 9/1081 |
| 2018/0078437 A1* | 3/2018 | Panigada | A61G 7/075 |
| 2019/0104702 A1* | 4/2019 | Edwards | A01K 1/0272 |
| 2020/0100882 A1* | 4/2020 | Lee | A01K 13/00 |
| 2022/0401204 A1* | 12/2022 | Vitenson | A61D 3/00 |
| 2024/0049678 A1* | 2/2024 | Edwards | A01K 1/0272 |

FOREIGN PATENT DOCUMENTS

| | | | |
|---|---|---|---|
| GB | 2106183 | | 4/1983 |
| NZ | 531089 A | * | 10/2005 |

* cited by examiner

RECOVERY CUSHION FOR ANIMALS

FIELD

The present invention relates to a recovery cushion for animals, more specifically to a cushion designed to facilitate recovery of animals after anesthesia thereby avoiding the anesthetized animals get hurt when recovering from anesthesia.

BACKGROUND

This section provides background information related to the present disclosure which is not necessarily prior art.

Certain treatments and/or pathologies in veterinary medicine require anesthesia of the animal to be treated and possibly surgery. Recovery from anesthesia is often complicated as the animals need to be protected from hurting themselves and thereby suffering from pathologies that may cause inability to stand up or to move. The heavier and the bigger the animal, the more it is subject to such inability.

Further, in the case of surgery, more specifically at the level of the legs, it is often preferred the animal does not immediately stand on its feed. It would be preferable to allow for a period of recovery during which the animal does not or does only progressively place weight on the relevant leg or legs.

Several techniques for recovery and/or reeducation of heavy animals after surgery are known. It is more specifically known to place the animal in water pool. This is rather costly, may be complicated to carry out and may not be suitable for all medical interventions.

Another known technique consists in suspending the relevant animal on a harness. Such known harnesses may be difficult to use and the results obtained by their use may be disappointing. Moreover, the risk of an animal falling out of the harness or a strap or belt slipping away may not be completely excluded.

Document GB-2106183 discloses a lifting device for animals comprising an inflatable bag on a stabilizing frame. A harness is provided for strapping the animal to the bag. In the case of use with a cow, for instance, the animal can be rolled on to the deflated bag and strapped on. As inflation proceeds, the animal is raised up, and the bag ultimately takes the entire weight of the animal.

U.S. Pat. No. 4,491,089 also discloses an inflatable bag or mattress comprising through holes corresponding to the animal's legs. Cutouts are provided for to allow easy withdrawal of the bag. But the arrangement of the through holes and of the cutouts requires that the bag needs to be fully approximately fully deflated for withdrawal.

The inventor has filed FR-3039968 and CA3039449 which overcome some of the above raised disadvantages and which are designed essentially to sustain the animal in standup position, thereby reducing the weight resting on some at least of their legs. Thereby, some at least of the animal legs may remain unloaded while the nevertheless is standing up.

SUMMARY

This section provides a general summary of the disclosure, and is not a comprehensive disclosure of its full scope or all of its features.

The present invention now seeks to provide a means for allowing comfortable recovery of animals, more specifically heavy animals, e.g. after anesthesia.

An object or aspect of the invention is to provide a means for allowing comfortable recovery of an animal after anesthesia, thereby allowing the animal to progressively rest on its legs.

According to another aspect of the invention, there is provided a process to allow for comfortable recovery of an animal, more specifically a heavy animal, after anesthesia and/or surgery and/or other intervention requiring recovery.

According to an aspect of the invention, there is provided a cushion assembly comprising an inflatable main body taking the general shape of an E (e.g., a capital English letter E, etc.) and an inflatable closing body designed to be assembled with the main body thereby closing the E-shape of the main body.

The closing body may be assembled with the main body by means of belts and buckles, straps and rings or hook-and-loop fasteners or equivalent means.

According to an advantageous embodiment, the inflatable main body showing globally the shape of an E is surmounted with an upper, preferably inflatable, cushion assembled with the E-shaped main body and covering the upper part of the exterior web and flanges of the E.

The E-shaped main body may advantageously comprise at least two superimposed E-shaped inflatable tube cushions assembled with each other by means of belts and buckles, straps and rings and/or hook-and-loop fastener or equivalent means. As will easily be understood by the skilled addressee, this advantageous arrangement allows to adapt the recovery cushion to several animal leg heights.

The superimposed tube cushions may be at least partially covered by an internal and/or external cover sheet. The cover sheets may be made of a plastic protective sheet material fastened to the relevant cushions by means of hook-and-loop fastener straps known per se. It will be easily understood that the cover sheets have a protective function, that is that they protect the cushions from being damaged by animal bites or hooves for instance. In addition, they stabilize and mechanically reinforce the structure of the recovery cushion.

According to another preferred embodiment, the closing body may be at least partially covered by a plastic sheet or embedded in a plastic sheet shell, the plastic sheet or sheet shell being fastened to the closing body by means of belts and buckles, straps and rings and/or hook-and-loop fastener straps known per se. Here too, the plastic sheet or shell essentially has a protective function, i.e. to protect the closing body from being damaged by animal bites, by hooves or by displacements by sliding over the ground, notably to close the main body.

The cushion assembly of the invention has shown to be particularly efficacious and easy to use. After surgery or other treatment requiring anesthesia, the animal may be carefully deposited by lifting means known per se onto the main cushion body the height of which has previously been adapted to the relevant animal. Such lifting means may transport the anesthetized animal by its legs from the surgery table to the inflated recovery cushion of the invention, and deposit it slowly, with the animal body resting onto the web part of the E-shaped main body and the legs going slowly down until they hang in the corresponding spaces between the flanges of the E-shaped main body. Once the animal is seen to be resting comfortably and safely on the main body, possibly with its stomach or rumen on the central flange of the E-shaped main body, the closing body of the recovery cushion may be fastened to the main cushion body. When the animal starts recovering and it is considered that its legs may, optionally progressively, take up its weight again, the main body may be slowly, optionally progressively, deflated thereby allowing the animal to rest more and more on its legs again.

The cushion assembly of the invention has been proven to be of particular interest in the recovery process of anesthetized horses. Horses are known for their sensitive legs. The invention recovery cushion allows for safe and comfortable recovery of a horse, with reduced risk of the horse hurting itself. The animal is in safe position and requires just some regular surveillance; no continuous presence of a veterinarian or assistant is required.

At times where more and more importance is allocated to animal well-being, the use of a recovery cushion in accordance with the invention makes best sense. The animal may remain a required period of time in a safe and comfortable position. Manipulations are reduced and risks are particularly reduced also. Knowing that in 99% of the cases a heavy animal remaining lying for more than 3 days needs to be put down, the assembly of the invention is of real progress.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure. In connection therewith, the invention will be described in more details herein below with reference to the attached drawings, wherein.

In the figures, same or similar elements bear the same reference sign. Further, it is to be noted that the figures show an exemplary embodiment of the invention which is not to be interpreted as restricting the scope of the invention in any way.

DETAILED DESCRIPTION

Example embodiments will now be described more fully with reference to the accompanying drawings. The description and specific examples included herein are intended for purposes of illustration only and are not intended to limit the scope of the present disclosure.

Figure 1:
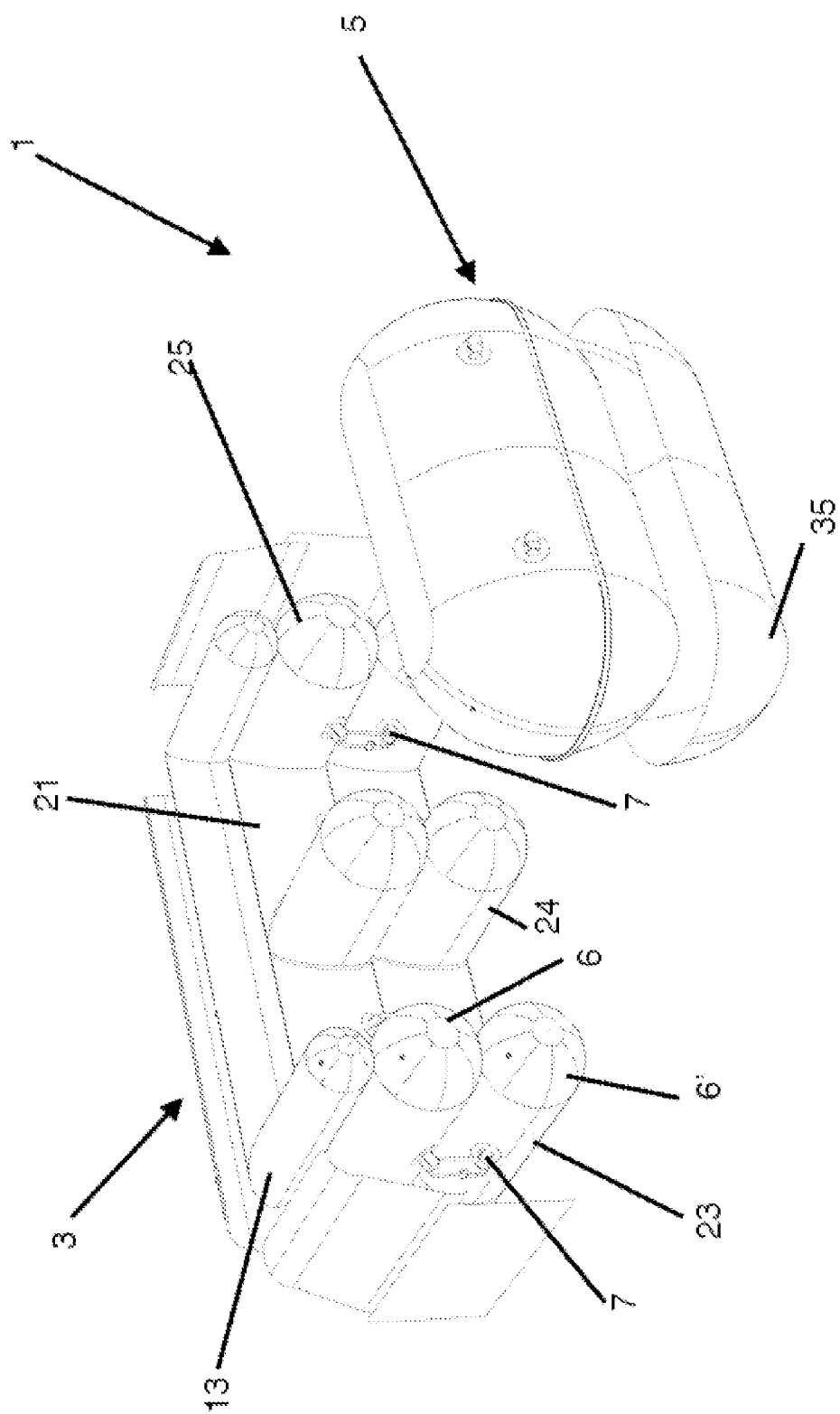
FIG. 1 shows an exploded perspective view of a recovery cushion assembly for heavy animals.
Figure 2:
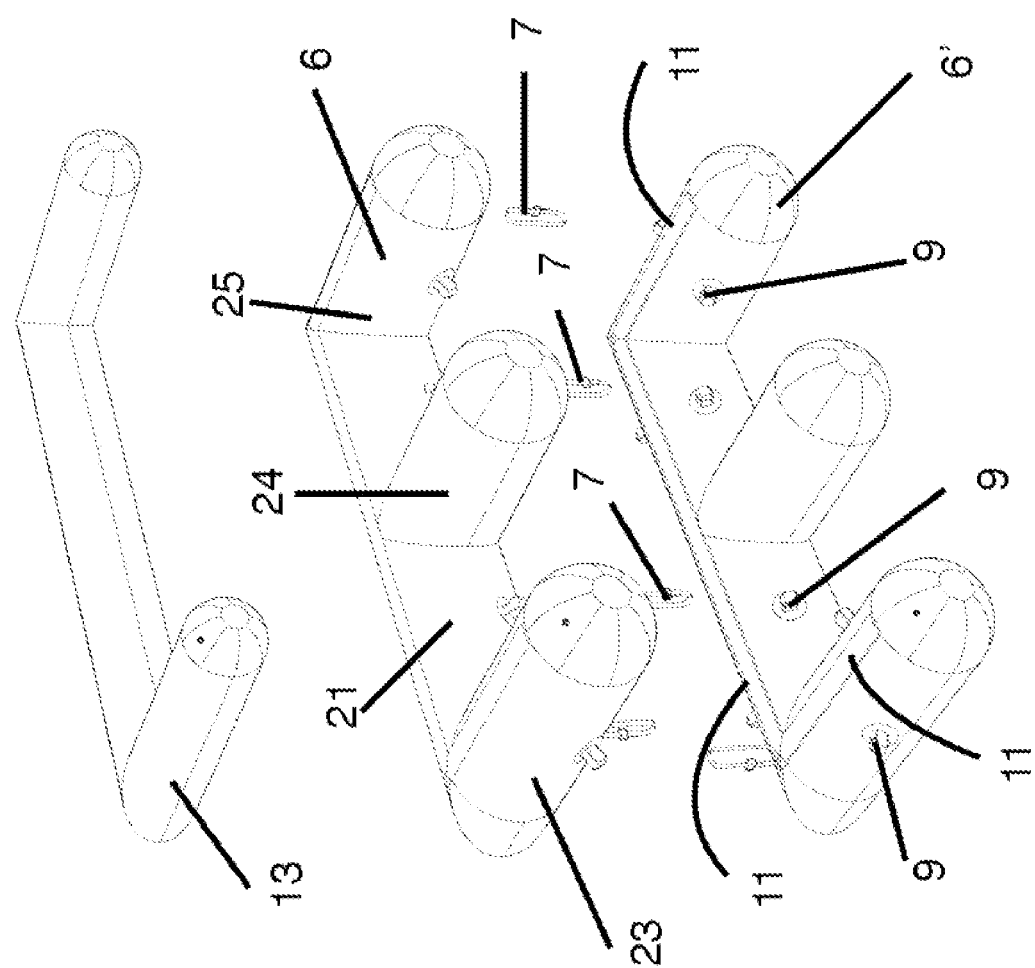
FIG. 2 shows an exploded view of the main cushion body.
Figure 3:
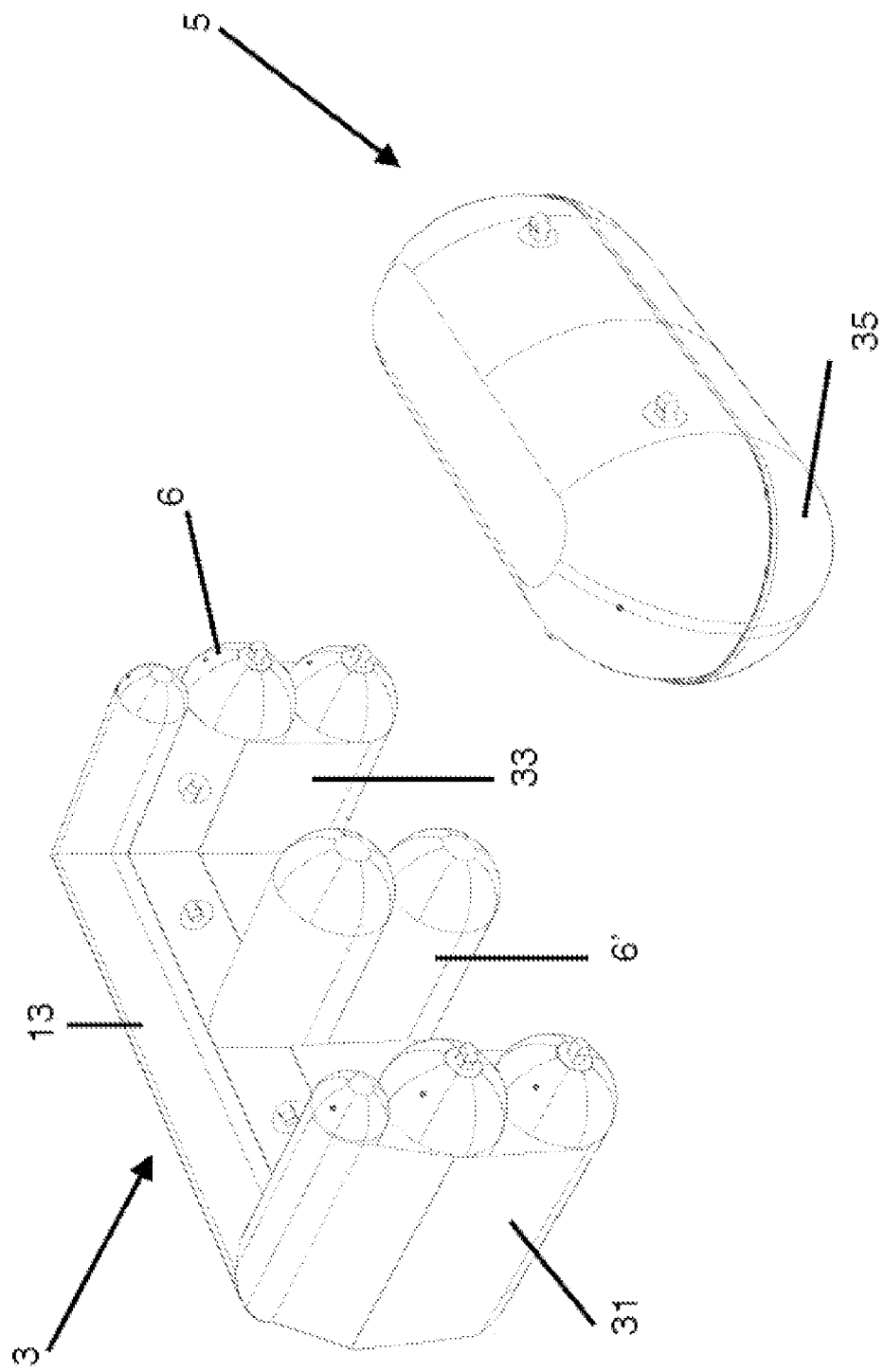
FIG. 3 shows a perspective view of the recovery cushion assembly, the closing cushion body being shown separate from the main cushion body.

As can be seen from FIGS. 1 and 3, the invention recovery cushion assembly 1 is composed of an inflatable main cushion body 3 and an inflatable closing body 5 (e.g., inflatable by way of air or other gas or fluid, etc.). In FIGS. 1 and 3, the closing body 5 is shown separate from the main cushion body 3, but it is intended to be displaced up against and secured to the main cushion body 3, in order to safely maintain the animal resting on the recovery cushion 1 to be sustained in safe and comfortable position.

The inflatable main cushion body 3 takes the general shape of an E (e.g., a capital, English alphabetic letter E; etc.), with a web 21 and flanges 23,24,25, and the inflatable closing body 5 generally takes the shape of an elongated ellipsoid or parallelepiped and is designed to be assembled with and secured to the main body thereby closing the E-shape of the main body 3. It is understood that "closing the main body" means that the closing body 5 closes the main body 3 by linking at least the external flanges 23,25 of the main body 3 (e.g., by way of the closing body 5, etc.).

According to a preferred embodiment, the main cushion body 3 comprises at least two superimposed E-shaped inflatable tube cushions 6 and 6' assembled with each other by means of belts 7 and buckles 9, straps and rings and/or hook-and-loop fasteners 11 or equivalent means. This advantageous arrangement allows to adapt the recovery cushion 1 to several animal leg heights.

According to another preferred embodiment, the main cushion body 3 showing globally the shape of an E is surmounted with an upper, preferably inflatable, tube cushion 13 assembled with the E-shaped main body 3,6,6' and covering the upper part of the exterior web and flanges of the E-shaped main cushion body.

The superimposed tube cushions 6,6' may be at least partially covered by an internal and/or external cover sheet 31,33 (FIG. 3). The cover sheets 31,33, may be made of a plastic protective sheet material fastened to the relevant cushions by means of hook-and-loop fastener straps 11 known per se. It will be easily understood that the cover sheets 31,33 have a protective function, that is that they protect the cushions from being damaged by animal bites or hooves for instance. In addition, they stabilize and mechanically reinforce the structure of the recovery cushion 1.

Similarly, the closing body 5 may be at least partially covered by a plastic sheet or embedded in a plastic sheet shell 35, the plastic sheet or sheet shell 35 being fastened to the closing body by means of belts and buckles, straps and rings and/or hook-and-loop fastener straps known per se. The plastic sheet or shell 35 is designed to protect the closing body 5 from being damaged by animal bites, by hooves or by displacements by sliding over the ground, to close the main body 3.

As will be easily understood, after surgery or other treatment requiring anesthesia, the animal may be carefully deposited with its body resting essentially onto the web part 21 of the E-shaped main body 3 and the legs going slowly down until they hang in the corresponding spaces between the flanges 23 and 24, and 24 and 25, of the E-shaped main body 3. Once the animal is seen to be resting comfortably and safely on the main body 3, possibly with its stomach or rumen on the central flange 24 of the E-shaped main body 3, the closing body 5 of the recovery cushion 1 may be fastened to the main cushion body 3. When the animal starts recovering and it is considered that its legs may, optionally progressively, take up its weight again, the main cushion body may be slowly, optionally progressively, be deflated thereby allowing the animal to rest more and more on its legs again.

The invention cushion assembly is of particular interest in the recovery process of anesthetized horses. Horses are known for their sensitive legs and joints. The invention recovery cushion now allows for safe and comfortable recovery of a horse, with reduced risk of the horse hurting itself. The animal is in a safe position and requires just some regular surveillance. Continuous presence of a veterinarian or assistant is no longer required.

At times where more and more importance is allocated to animal well-being, the use of a recovery cushion in accordance with the invention makes good sense. The animal may remain a required period of time in a safe and comfortable position. Manipulations are reduced and risks are particularly reduced also.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Specific dimensions, specific materials, and/or specific shapes disclosed herein are example in nature and do not limit the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A recovery cushion assembly for animals, the recovery cushion assembly consisting of:
    (a) an inflatable main cushion body taking the general shape of an E, the main cushion body including an inflatable exterior web, inflatable exterior flanges, and an upper tube cushion covering an upper part of the exterior web and the exterior flanges;
    (b) an inflatable closing body designed to be assembled with the main cushion body at a location generally opposite the inflatable exterior web thereby closing the E-shape of the main cushion body; and
    (c) one or more of belts and buckles, straps and rings, and/or hook-and-loop fasteners configured to assemble the closing body with the main cushion body.

2. The recovery cushion assembly of claim 1, wherein the main cushion body is defined by at least two superimposed E-shaped inflatable tube cushions assembled on top of each other.

3. The recovery cushion assembly of claim 1, wherein the tube cushion is inflatable.

4. A process for facilitating recovery of an animal after anesthesia, the process comprising:
    providing the recovery cushion assembly of claim 1;
    adjusting a height of the recovery cushion assembly to a height of the animal;
    positioning the anesthetized animal onto the inflatable E-shaped main cushion body of the recovery cushion assembly, with a body of the animal resting on the web of the main cushion body and legs of the animal positioned in corresponding spaces between the flanges of the main cushion body; and
    fastening the inflatable closing body to the main cushion body.

5. A recovery cushion assembly for animals, the recovery cushion assembly consisting of:
    (a) an inflatable main cushion body taking the general shape of an E, the main cushion body including:
    at least two superimposed E-shaped inflatable tube cushions assembled with each other to define an inflatable exterior web, an inflatable interior flange, and inflatable exterior flanges;
    an upper tube cushion covering an upper part of the exterior web and the exterior flanges defined by the assembled at least two superimposed E-shaped inflatable tube cushions; and
    an internal and/or external cover sheet at least partially covering the superimposed tube cushions;
    (b) an inflatable closing body designed to be assembled with the main cushion body at a location generally opposite the inflatable exterior web thereby closing the E-shape of the main cushion body; and
    (c) one or more of belts and buckles, straps and rings, and/or hook-and-loop fasteners configured to assemble the closing body with the main cushion body.

6. A recovery cushion assembly for animals, the recovery cushion assembly comprising:
    an inflatable main cushion body having an inflatable web and multiple inflatable flanges extending from the inflatable web, the multiple inflatable flanges including two external inflatable flanges and a central inflatable flange disposed between the two external inflatable flanges such that the inflatable web and the multiple inflatable flanges define a general shape of an E; and an inflatable closing body taking the general shape of an ellipsoid or parallelepiped, the inflatable closing body designed to be assembled against an end portion of each of the multiple inflatable flanges at a location opposite the inflatable web to thereby close the E-shape of the inflatable main cushion body.

7. The recovery cushion assembly of claim 6, wherein the inflatable main cushion body and the inflatable closing body are each configured to rest on a ground surface to support an animal in the recovery cushion assembly on the ground surface.

8. The recovery cushion assembly of claim 6, wherein the inflatable main cushion body includes at least one tube cushion defining the inflatable web and the multiple inflatable flanges, and wherein the inflatable web and the multiple inflatable flanges define a common volume of the at least one tube cushion.

9. The recovery cushion assembly of claim 6, wherein the inflatable main cushion body includes multiple tube cushions assembled on top of each other, each of the multiple tube cushions having an inflatable web and multiple inflatable flanges, and wherein the inflatable web and the multiple inflatable flanges of each of the multiple tube cushions define a common volume.

\* \* \* \* \*